United States Patent
Monti

(10) Patent No.: US 6,758,322 B2
(45) Date of Patent: Jul. 6, 2004

(54) METHOD AND DEVICE FOR TRANSFERRING BLISTER PACKS AND THE LIKE FROM A CUTTING STATION TO A FEEDING LINE OF A PACKAGING MACHINE

(75) Inventor: Giuseppe Monti, Pianoro (IT)

(73) Assignee: Marchesini Group S.p.A., Bologna (IT)

( * ) Notice: Subject to any disclaimer, the term of this patent is extended or adjusted under 35 U.S.C. 154(b) by 17 days.

(21) Appl. No.: 10/288,092

(22) Filed: Nov. 5, 2002

(65) Prior Publication Data

US 2003/0085102 A1 May 8, 2003

(51) Int. Cl.⁷ .............................................. B65G 47/26
(52) U.S. Cl. .................. 198/433; 198/377.08; 198/456
(58) Field of Search ................................ 198/432, 433, 198/418.6, 377.08, 456

(56) References Cited

U.S. PATENT DOCUMENTS

| | | | |
|---|---|---|---|
| 3,580,442 A | * 5/1971 | Rohdin et al. ................... 225/2 |
| 4,955,783 A | * 9/1990 | Grazia .......................... 414/795 |
| 5,105,606 A | * 4/1992 | Creed et al. .................... 53/499 |
| 5,155,981 A | * 10/1992 | Tordini .......................... 53/559 |
| 5,299,907 A | * 4/1994 | Dal Pozzo ................ 414/797.8 |
| 5,363,968 A | * 11/1994 | Soloman ....................... 209/546 |
| 5,579,894 A | * 12/1996 | Glazier et al. ............... 198/431 |
| 5,848,514 A | * 12/1998 | Edwards et al. ................ 53/53 |
| 5,862,646 A | * 1/1999 | Orillo ............................. 53/53 |
| 5,895,192 A | * 4/1999 | Parnell et al. .......... 414/225.01 |
| 6,070,385 A | * 6/2000 | Antonio ........................... 53/53 |
| 6,098,782 A | * 8/2000 | Hardage et al. ............. 198/403 |
| 6,283,694 B1 | * 9/2001 | Spatafora et al. ....... 414/416.05 |
| 6,347,709 B1 | * 2/2002 | Biehl et al. .................. 209/552 |
| 6,652,215 B1 | * 11/2003 | Parker et al. ............... 414/412 |

FOREIGN PATENT DOCUMENTS

| | | |
|---|---|---|
| DE | 32 33 186 | 4/1994 |
| EP | 0 465 437 | 1/1992 |
| EP | 0 466 660 | 1/1992 |
| FR | 2692869 | 12/1993 |
| WO | WO 00 68086 | 11/2000 |

* cited by examiner

Primary Examiner—Douglas Hess
(74) Attorney, Agent, or Firm—William J. Sapone; Coleman Sudol Sapone, P.C.

(57) ABSTRACT

According to a method for transferring blister packs to a feeding line of a packaging machine, a series of blister packs arranged in a line at a cutting station is picked-up and arranged in alignment with receiving and moving means, adjacent to the cutting station. The series of blister packs is released simultaneously, so that a first blister pack, situated in a foremost position falls onto the receiving and moving mechanism and the further blister packs of the series of blister packs fall onto support elements, carried by a selective releasing member and disposed above the receiving and moving mechanism. The support elements are operated selectively, so as to release, one by one and in succession, the further blister packs aligned and regularly spaced apart, onto the receiving and moving mechanism.

19 Claims, 4 Drawing Sheets

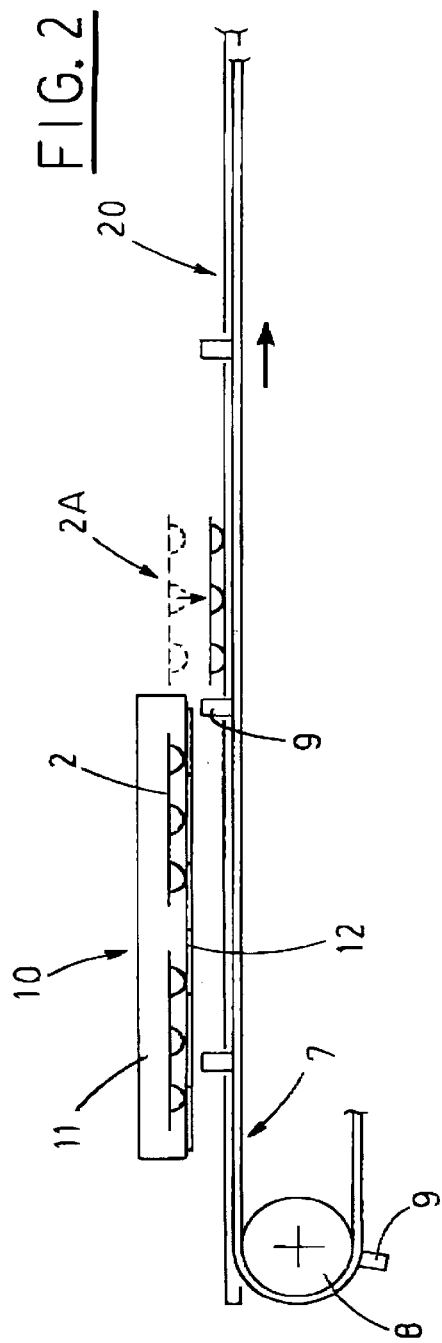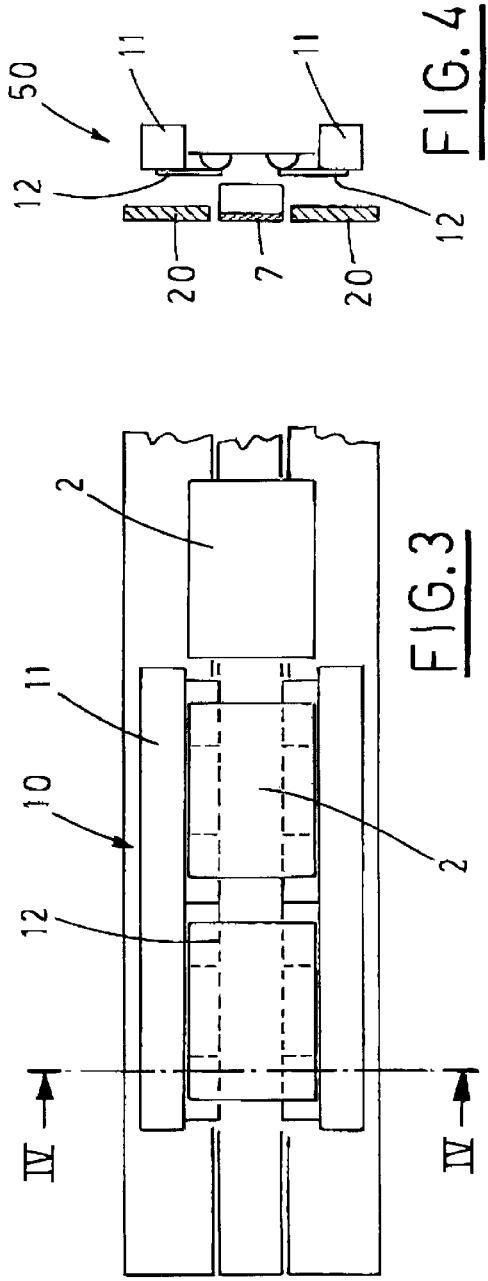

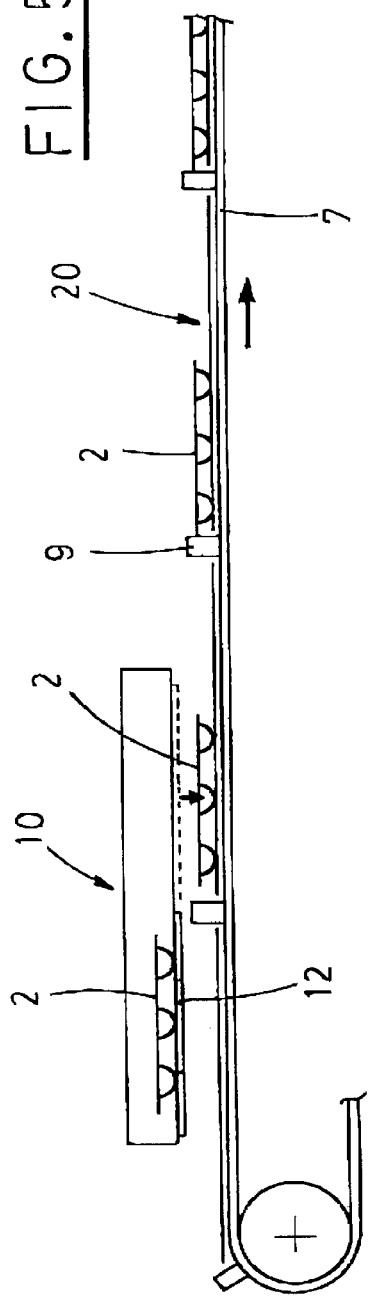
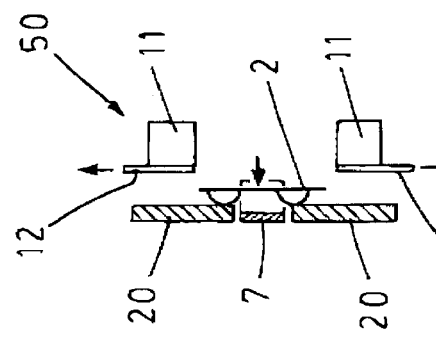
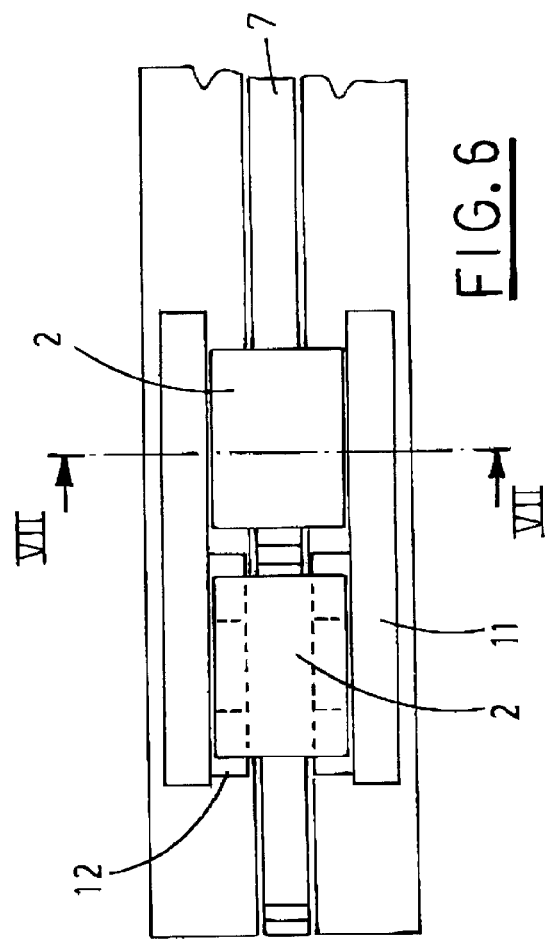

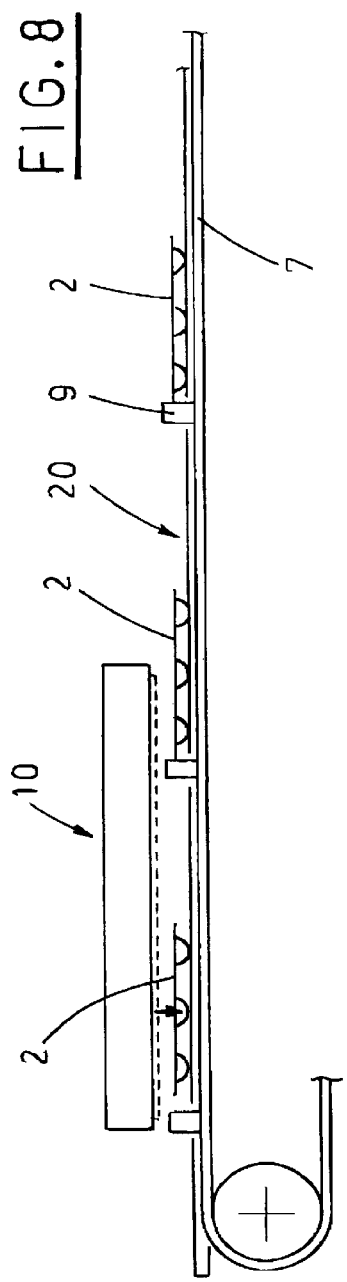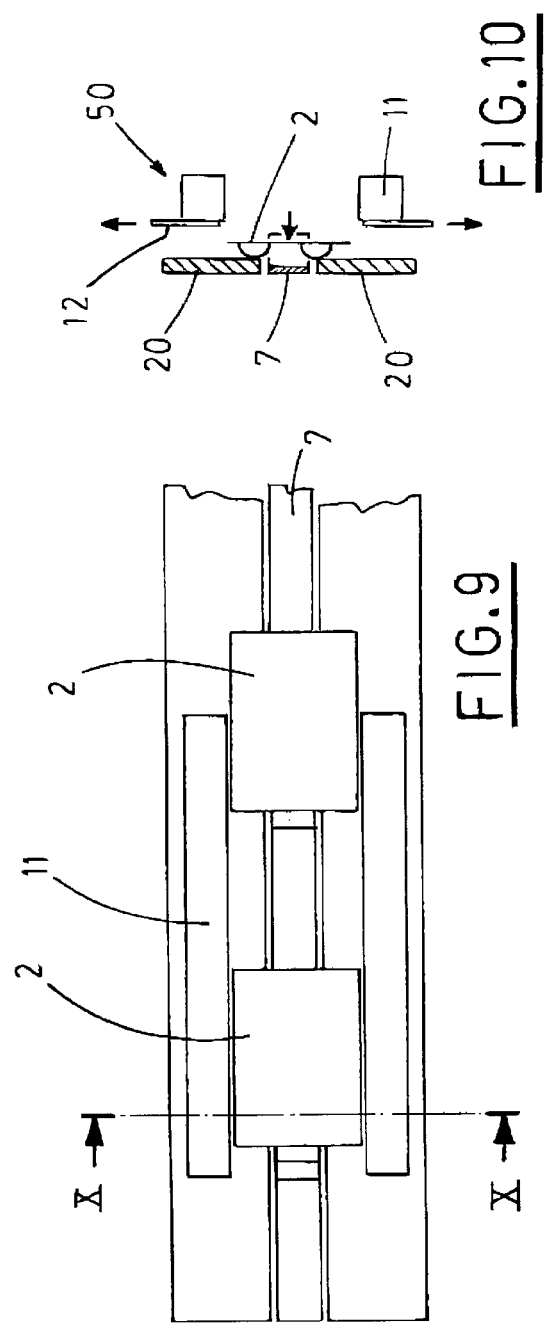

METHOD AND DEVICE FOR TRANSFERRING BLISTER PACKS AND THE LIKE FROM A CUTTING STATION TO A FEEDING LINE OF A PACKAGING MACHINE

BACKGROUND OF THE INVENTION

The present invention relates to feeding blister packs to an automatic packaging machine.

More precisely, the invention relates to a method for transferring blister packs from the cutting station of a so-called blistering machine to a feeding line of a packaging line, as well as to a device which carries out this method.

DESCRIPTION OF THE PRIOR ART

As it is known, blister packs are obtained by cutting a band, which has a plurality of blisters, suitably arranged, filled with respective products.

At each step of the blister band forward movement in the cutting station of the blistering machine, a series or a group of blister packs are usually obtained from the blister band, which blister pack are aligned along a direction crosswise to the band longitudinal axis.

Then, the group of blister packs must be transferred to the feeding line of the packaging machine, which introduces the blister packs in suitable boxes or cases.

The transferring of the groups of blister packs from the cutting station to the feeding line of the packaging machine is the critical step in the production of this type of packages.

According to a known technical solution, the blister packs of each group are transferred from the cutting station to corresponding receiving lines, arranged side by side, without changing the orientation of the blister packs; first, the blister packs of one line are shifted with respect to the blister packs of the adjacent line, and subsequently, the blister packs are arranged on one single line, one after another.

According to another technical solution, the blister packs of each group are placed onto the receiving lines after having been shifted and turned over, i.e. with the blisters turned upwards.

In both above described cases, the blister packs are moved perpendicularly to the direction of their longer extension, i.e. longitudinal direction, along which e.g. three or more blisters with relative products are arranged.

This arrangement is not the most convenient, if a corresponding print is required on each portion of the blister pack containing a relative product: in this case, it is necessary to provide as many stamping heads (e.g. ink-jet type and the like) as there are rows of blisters arranged perpendicularly.

It is obvious to those skilled in the art that there operation difficulties are encountered if the blister packs are overturned, i.e. with the blisters turned upwards.

According to other known technical solutions, the blister packs are situated on one conveyor belt, with the longitudinal axes of the blister packs being oriented in alignment with the movement direction of the belt.

In this situation, the mutual positioning between blister packs of each group is identical to the one defined in the cutting station and no in-step pulling devices (lugs) can be provided in the conveyor belt for maintaining positive control of the position of each single blister pack being transferred, in order to e.g. reject possible defective blister packs.

Another problem derives from the change of blister packs size, which usually requires complicated and expensive changeover operation on the lines.

SUMMARY OF THE INVENTION

It is an object of the present invention is to propose a method, which allows automatic transfer of blister packs in series from a cutting station to the feeding line of a packaging machine, maintaining the arrangement in a row and the positive control of the blister packs being transferred.

Another object of the present invention is to propose a method which allows the single blister packs to be arranged suitably in a row and spaced apart during the transferring, so as to allow an easy performing of intermediate ope4ration steps, such as printing on the blister packs, using one or at most two printing heads.

Yet a further object of the present invention is to propose a device which allows the above mentioned method to be carried out by a constructively simple and functional structure, which is versatile in relation to the type of blister packs to be transferred.

Still a further object of the present invention is to propose a device which realizes what above without turning over the blister packs.

The above mentioned objects are obtained in accordance with the content of the claims by means of a method for transferring blister packs and the like from a cutting station to the feeding line of a packaging machine, including the following steps:

picking up a series of blister packs arranged in a line at a cutting station;

arranging said series of blister packs in alignment with receiving and moving means disposed adjacent to said cutting station;

simultaneous releasing of said series of blister packs onto support elements, carried by selective releasing means and disposed above said receiving and moving means;

selectively operating said support elements of said selective releasing means, so as to release, one by one and in succession, said blister packs aligned and regularly spaced apart, onto said receiving and moving means.

In a modified embodiment of the invention, the method includes the following steps:

picking up a series of blister packs arranged in a line at a cutting station;

arranging said series of blister packs in alignment with receiving and moving means disposed adjacent to said cutting station;

simultaneous releasing of said series of blister packs so as to place a first blister pack, situated in a foremost position according to said forward movement direction of said receiving and moving means, onto said receiving and moving means and place further blister packs of said series of blister packs onto support elements, carried by selective releasing means and situated above said receiving and moving means;

release, one by one and in succession, said further blister packs aligned and regularly spaced apart, onto said receiving and moving means.

According to the invention, a device for carrying out the method described herein includes:

receiving and moving means, situated adjacent to the cutting station for cutting the blister packs;

pick-up means for picking-up a series of aligned blister packs, situated at said cutting station, and for arranging said series of blister packs in alignment with said receiving and moving means;

selective blister packs releasing means situated above said receiving and moving means and equipped with support elements for receiving said blister packs picked-up and released by said pick-up means and for selectively releasing said blister packs, in alignment and regularly spaced apart, onto said receiving and moving means.

BRIEF DESCRIPTION OF THE DRAWINGS

The characteristic features of the present invention will be pointed out in the following description of a preferred, but not unique embodiment, with reference to the enclosed drawings, in which:

FIG. 2 is an enlarged lateral view of the proposed device;

FIG. 3 is a corresponding partial top view of the proposed device;

FIG. 4 is a section view taken along the plane IV—IV of FIG. 3;

FIGS. 5 and 6 show respectively lateral and top views of the proposed device in a subsequent operation step;

FIG. 7 is a section view taken along the plane VII—VII of FIG. 6;

FIGS. 8 and 9 are respective lateral and top views of the proposed device in a subsequent operation step;

FIG. 10 is a section view taken along the plane X—X of FIG. 9.

DESCRIPTION OF THE PREFERRED EMBODIMENTS

Figure 1:
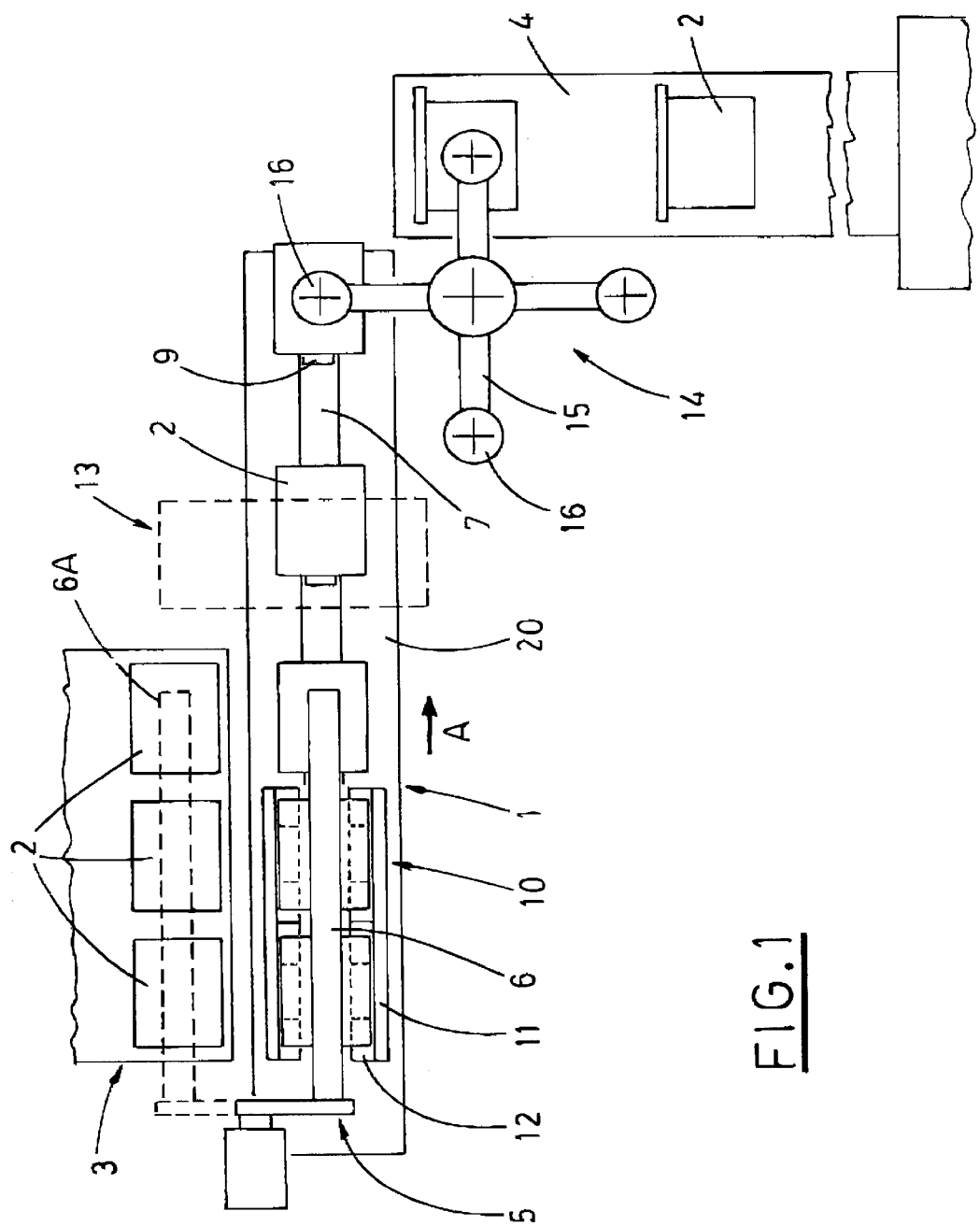
FIG. 1 is a plan schematic view of the proposed device for transferring blister packs to the feeding line of a packaging machine.

With reference to the above mentioned figures, reference number 1 indicates a device for transferring blister packs 2 from a cutting station 3 of a blistering machine to a feeding line 4 of a packaging machine.

According to the case illustrated herein, in the cutting station 3, a group of three blister packs 2 are cut from the blister band at each step.

The so obtained blister packs 2 are provided aligned at an outlet area of the cutting station, as seen in FIG. 1.

However, it is obvious that the number of blister packs processed each time can be different, in relation to the needs.

The transferring device 1 includes a pick-up member 5 for picking-up blister packs 2 from the outlet area of the cutting station 3 and transferring them to adjacent receiving and moving means, generally indicated with 50.

The moving means include a conveying belt 7, which is set around a series of suitably powered endless pulleys 8 extending in a closed path. The conveying belt defines an upper active run extending horizontally in a direction parallel to the alignment axis of a series of blister packs 2, at the outlet of the cutting station 3.

Two longitudinal guides 20 are situated on both sides of the above upper run slightly above it (FIGS. 4, 7, 10).

The conveying belt 7 has a series of transversal lugs 9, regularly spaced apart, between which respective spaces are defined for receiving, as will be specified later on, blister packs 2, which abut against the guides 20 while being transferred to the feeding line 4.

The pick-up member 5 includes an arm 6 for gripping the blister packs 2, which reciprocates between a pick-up position, indicated with broken line 6A and in which the blister packs 2 are picked-up from the cutting station 3, and a release position, in which the blister packs 2, still aligned, are placed onto the conveyor belt 7.

A selective releasing member 10 for selective releasing of blister packs 2 is situated in the region corresponding to an area where the pick-up member 5 releases the blister packs 2, above the conveyor belt 7.

The selective releasing member 10 includes a pair of lateral plates 11 for retention of the blister packs 2, which are arranged longitudinally to the conveyor belt 7.

A plurality of retractable support elements 12 extend symmetrically from the plates 11 and are operated selectively by respective actuator means, e.g. electric or pneumatic or mechanical, not shown as of known type.

More precisely, the selective releasing member 10 extends longitudinally to the conveyor belt 7, so as to support in line the blister packs 2 released by the pick-up member 5 and supported on both sides by the retractable support elements 12, excluding a first blister pack situated in a foreward position along the forward movement direction A of the conveyor belt 7.

As it will be explained later, the first blister pack, indicated with the broken line 2A in FIG. 2, falls directly onto the guides 20, associated to the conveyor belt 7 and situated below.

It is obvious that the retractable support elements can extend longitudinally, so that, if necessary, also the above mentioned first blister pack will be received thereon.

A printing head, indicated with broken line 13 in FIG. 1, e.g. an ink-jet head, can be situated downstream of the selective releasing member 10, along the forward movement direction A of the conveyor belt 7.

The blister packs 2, conveyed along the guides 20 and pushed by the lug 9 of the conveyor belt 7, are transferred one by one to the feeding line 4 of the packaging machine e.g. by a carrousel 14, operated stepwise in rotation.

The feeding line 4 is preferably situated perpendicular to the conveyor belt 7 and on the same horizontal plane.

The carrousel 14 has a plurality of radial arms 15 equipped with gripping means 16. The Gripping means are in turn rotated on a vertical axis, so as to make the blister packs 2 counter-rotate, with respect to rotation of the carrousel, during the transferring step, in order to maintain unchanged the blister packs 2 orientation.

According to the proposed method for transferring the blister packs 2 to the feeding line 4 of the packaging machine, the pick-up member 5 takes a series of aligned blister packs 2 from the cutting station 3 of the blistering machine.

The gripping arm 6 of the pick-up member 5 is translated from the position 6A, in which the blister packs 2 are picked-up, to the position, in which the blister packs 2 are released in alignment with the conveyor belt 7 (FIG. 1).

Then, the series of blister packs 2 held by the gripping arm 6 is released simultaneously, so as to place a first blister pack, indicated with 2A, and disposed in most forward position, considering movement direction A of the conveyor belt 7, on the guides 20, where it is contacted by a lug 9, while other blister packs 2 of the above mentioned series of blister packs 2 are placed in a row resting on the retractable support elements 12 of the selective releasing member 10 (FIG. 2).

The blister packs 2 released on the retractable support elements 12, are placed between the lateral plates 11, so as to maintain the correct reciprocal alignment.

In suitable step relation with the conveyor belt 7 forward movement, the retraction of the support elements 12 is operated selectively, so as to let a second blister pack 2 go down onto the guides 20, where it is contacted and subsequently pushed by a lug 9 of the conveyor belt 7 (FIGS. 5 and 6).

Obviously, only the fore support elements 12, which support the second blister pack 2, are retracted (see in particular FIG. 7), while the rear support elements 12 remain protruding in active position.

The subsequent selective operation of the rear support elements 12 causes the third blister pack 2 to fall down onto the guides 20, where it is contacted and pushed by a lug 9 of the conveyor belt 7 (FIGS. 8, 9 and 10).

Otherwise, as it has been already said, the support elements 12 can extend longitudinally, so as to keep also the first blister pack; the first, second and third blister packs are released onto the guides 20 situated below by corresponding selective commands imparted to the support elements 12.

In both cases, the blister packs are not overturned, so the blisters are always turned downwards (FIG. 2).

It is to be pointed out that single blister packs 2 are released one by one onto the guides 20, disposed aligned in a row and each inside a respective space defined between a pair of adjacent transversal lugs 9 of the conveyor belt 7.

The lugs 9 form contacting and pushing means for the blister packs 2 during the conveyor belt 7 forward movement.

Consequently, the blister packs are placed on the guides 20, where they are pushed by the lugs 9: thus, the constant distance between two adjacent blister packs is ensured.

It is to be pointed out that the longitudinal axis of each blister pack, which coincides with the blister pack maximum dimension, is parallel to the above mentioned forward direction A.

If required, the blister packs 2 conveyed in a row by the conveyor belt 7 pass the working area of an optional printing head 13, which prints desired messages on the blister packs 2; in this case, due to what has been said above, the printing heads work along the longitudinal direction of the blister packs, which helps to reduce their number.

In the outlet area of the belt 7, the blister packs 2 are taken over one by one by the gripping means 16 of the carrousel 14 and then transferred to the feeding line of the packaging machine, situated perpendicular to the conveyor belt 7.

The rotation of the gripping means 16, in opposite direction with respect to the rotation direction of the carrousel 14, determines, during the transferring step, a counter-rotation of the blister packs 2 which allows the original orientation of the blister packs 2 to remain unchanged on the feeding line 4 (see again FIG. 1).

Therefore, the proposed method fulfills the object of automatically transferring blister packs in series from the cutting station of the blistering machine to the feeding line of the packaging machine, maintaining the in-row alignment and the positive control of the transferred blister packs.

Actually, the proposed method allows to align and suitably space apart the single blister packs 2 along a transport line, on which the blister packs 2 move forward in a line, released one by one into respective spaces defined by the guides 20 and the transversal lugs 9 of the conveyor belt 7, so as to identify positively the position of each blister pack.

This allows in particular to reject possible defective blister packs in an unmistakable way and with simple means.

The forward movement in blister packs 2 in a line allows also intermediate operation steps to be easily performed, such as printing of the blister packs 2 by one or at most two printing heads 13, with proportionally reduced costs.

An advantage of the present invention derives from great use versatility of the device carrying out the described method. In particular, the device allows to change the blister packs size in a simple and rapid way, since it is enough to substitute only one selective releasing member 10, which necessarily has to match the blister pack size, while the transferring line for blister packs is not changed.

Basically, the device can transfer any number of blister packs arranged in series at the outlet of the cutting station of the blistering machine.

What is claimed is:

1. A method for transferring blister packs from a cutting station to the feeding line of a packaging machine, the method including the following steps:

Picking up a series of blister packs arranged in a line at a cutting station;

arranging said series of blister packs in alignment with receiving and moving means moving in a forward movement direction and disposed adjacent to said cutting station;

simultaneous releasing of said series of blister packs so as to place a first blister pack situated in a foremost position according to the forward movement direction of said receiving and moving means, onto said receiving and moving means, and place further blister packs of said series of blister packs onto support elements, carried by selective releasing means and situated above said receiving and moving means;

selectively operating said support elements of said selective releasing means so as to release, one by one and in succession, said further blister packs aligned and regularly spaced apart, onto said receiving and moving means.

2. A method according to claim 1, wherein the orientation of said blister packs on said conveyor means is the same as their orientation in the cutting station.

3. A method for transferring blister packs from a cutting station to the feeding line of a packaging machine, characterized in that the method includes the following steps:

Picking up a series of blister packs arranged in a line at a cutting station;

arranging said series of blister packs in alignment with receiving and moving means moving in a forward movement direction and disposed adjacent to said cutting station;

simultaneous releasing of said series of blister packs onto support elements, carried by selective releasing means and disposed above said receiving and moving means;

selectively operating said support elements of said selective releasing means so as to release, one by one and in succession, said blister packs aligned and regularly spaced apart, onto said receiving and moving means.

4. A method according to claim 3, wherein the orientation of said blister packs on said conveyor means is the same as their orientation in the cutting station.

5. A device for transferring blister packs from a cutting station to the feeding line of a packaging machine including a cutting station for cutting the blister packs, the device including:

receiving and moving means, situated adjacent to the cutting station;

pick-up means for picking-up a series of aligned blister packs, situated at said cutting station, and for arranging said series of blister packs in alignment with said receiving and moving means;

selective blister packs releasing means situated above said receiving and moving means and equipped with support elements for receiving said blister packs picked-up and released by said pick-up means and for selectively releasing individual blister packs, in alignment and regularly spaced apart, onto said receiving and moving means, where said blister packs are moved in a forward movement direction.

6. A device according to claim 5, wherein said selective releasing means extend longitudinally to said receiving and moving means, so as to support the blister packs in a row, as released by said pick-up means, and in abutment against said support elements.

7. A device according to claim 5, wherein said support elements are selectively retractable, as being controlled by suitable actuator means, to release said blister packs onto said receiving and moving means.

8. A device according to claim 5, wherein said selective releasing member includes a pair of lateral plates for retaining said blister packs, said lateral plates being arranged longitudinally to said receiving and moving means, from which said support elements protrude symmetrically.

9. A device according to claim 5, wherein said receiving and moving means include at least two longitudinal guides, situated parallel to said forward movement direction, aimed at receiving said blister packs, and a series of lugs, associated to said guides, said lugs being disposed transversal to said forward movement direction, regularly spaced apart, and moved synchronously in the forward movement direction to contact and push said blister packs lying onto said longitudinal guides.

10. A device according to claim 5, wherein said selective releasing means extend longitudinally to said receiving and moving means, so as to support the blister packs in a row, as released by said pick-up means, and in abutment against said support elements, except for a first blister pack of said series of blister packs, said first blister pack being situated in a foremost position, according to the forward movement direction of said blister packs on said receiving and moving means, and released directly onto said receiving and moving means.

11. A device according to claim 10, wherein said support elements are selectively retractable, as being controlled by suitable actuator means, to release said blister packs onto said receiving and moving means.

12. A device according to claim 10, wherein said selective releasing member includes a pair of lateral plates for retaining said blister packs, said lateral plates being arranged longitudinally to said receiving and moving means, from which said support elements protrude symmetrically.

13. A device according to claim 10, wherein said receiving and moving means include at least two longitudinal guides, situated parallel to said forward movement direction, aimed at receiving said blister packs, and a series of lugs, associated to said guides, said lugs being disposed transversal to said forward movement direction, regularly spaced apart, and moved synchronously in the forward movement direction to contact and push said blister packs lying onto said longitudinal guides.

14. A device according to claim 13, wherein said guides leave a free space between them and said lugs move in the space defined by said guides.

15. A device according to claim 13, wherein said lugs are carried by an endless belt, whose upper run is situated parallel to said longitudinal guides at a level lower with respect thereto.

16. A device according to claim 5, further including, situated downstream of said selective releasing member, along the forward movement direction, at least one printing head, which acts on said blister packs, moving in alignment on said receiving and moving means.

17. A device according to claim 5, further including a carrousel rotating stepwise in a region corresponding to the outlet area of said receiving and moving means and equipped with gripping means, which take over said blister packs from said receiving and moving means and transfer said blister packs to said feeding line, situated perpendicular to said receiving and moving means.

18. A device according to claim 17, wherein said gripping means rotate on a vertical axis, so as to make said blister packs counter-rotate in order to maintain unchanged their orientation on said feeding line.

19. A device according to any of the claims from 5, wherein the orientation of the blister packs on said conveying means is the same as their orientation in the cutting station.

* * * * *